US006832302B1

(12) United States Patent
Fetzer et al.

(10) Patent No.: US 6,832,302 B1
(45) Date of Patent: Dec. 14, 2004

(54) METHODS AND APPARATUS FOR DETECTING HEAP SMASHING

(75) Inventors: Christof Fetzer, Chester, NJ (US); Zhen Xiao, Randolph, NJ (US)

(73) Assignee: AT&T Corp., New York, NY (US)

( * ) Notice: Subject to any disclaimer, the term of this patent is extended or adjusted under 35 U.S.C. 154(b) by 639 days.

(21) Appl. No.: 10/000,384

(22) Filed: Oct. 24, 2001

(51) Int. Cl.[7] .............................................. G06F 12/00
(52) U.S. Cl. ...................... 711/170; 711/154; 711/165; 717/127; 717/163
(58) Field of Search ................................ 711/170, 154, 711/165; 717/127, 163

(56) References Cited

U.S. PATENT DOCUMENTS

| | | | | |
|---|---|---|---|---|
| 5,889,990 | A | * | 3/1999 | Coleman et al. ............ 719/322 |
| 6,202,205 | B1 | * | 3/2001 | Saboff et al. ............... 717/151 |
| 6,282,701 | B1 | * | 8/2001 | Wygodny et al. ........... 717/125 |
| 6,658,652 | B1 | * | 12/2003 | Alexander et al. .......... 717/128 |
| 6,675,378 | B1 | * | 1/2004 | Schmidt ..................... 717/154 |
| 2003/0056199 | A1 | * | 3/2003 | Li et al. ..................... 717/127 |
| 2003/0056200 | A1 | * | 3/2003 | Li et al. ..................... 717/128 |

OTHER PUBLICATIONS

R. Hastings et al., "Purify: Fast Detection of Memory Leaks and Access Errors," *Proc. of the Winter USENIX Conference*, 1992; pp. 125–136.
T. M. Austin et al., "Efficient Detection of All Pointer and Array Access Errors," *Proc. of ACM SIGPLAN '94 Conf.*, Jun. 1994, pp. 290–301.
K–P. Vo, "Vmalloc: A general and efficient memory allocator," *Software Practice & Experience*, Mar. 1996, pp. 1–21.
K–P. Vo et al., "Xept: A Software Instrumentation Method for Exception Handling," *8th Int'l. Symposium on Software Reliability Engineering*, 1997.
Aleph One, "Smashing The Stack For Fun And Profit," *Phrack Magazine*, 1998.
C. Cowan et al., "StackGuard: Automatic Adaptive Detection and Prevention of Buffer–Overflow Attacks," *Proc. 7th USENIX Security Symposium*, San Antonio, Texas, Jan. 26–29, 1998.
F. Salles et al., "MetaKernels and Fault Containment Wrappers," *IEEE Int'l. Symposium on Fault–Tolerant Computing*, 1999, pp. 22–29.
D. Wagner et al., "A First Step Towards Automated Detection of Buffer Overrun Vulnerabilities," *Proc. of the Network and Distributed System Security Symposium*, 2000.
A. Baratloo et al, "Transparent Run–Time Defense Against Stack Smashing Attacks," *Proc. of 2000 USENIX Annual Technical Conf.*, San Diego, CA, Jun. 18–23, 2000.
BIND, http://www.securityfocus.com/vdb/bottom.html?vid=2303.
Bruce Perens, ElectricFence: ftp//ftp.perens.com/pub/ElectricFence/.

* cited by examiner

*Primary Examiner*—Reba I. Elmore
(74) *Attorney, Agent, or Firm*—Kenyon & Kenyon

(57) ABSTRACT

A method and apparatus for detecting a heap smashing condition. A call to a library function, such as a request to write a data block to the heap section of a memory, is intercepted from a program being executed. In an embodiment, a fault-containment wrapper module determines whether performing the write request would smash the heap. If it would smash the heap, an error handling procedure is executed instead of writing the data block. If it would not smash the heap, the fault-containment wrapper module causes the data block to be written to the memory as requested.

31 Claims, 5 Drawing Sheets

METHODS AND APPARATUS FOR DETECTING HEAP SMASHING

FIELD OF THE INVENTION

The present invention relates to the field of computer system integrity and security. More particularly, the present invention relates to methods and apparatus for detecting a call to a library function that could overflow a buffer in the heap section of memory.

BACKGROUND

Buffer overflow attacks are a major cause of security breaches in modern computer systems. A buffer is a block of memory locations that are typically allocated to a particular program or function for use as a storage area. A buffer overflow (or "overrun") occurs when a software function (also known as a routine, module, etc.) writes data beyond the boundaries of a buffer that is allocated to the function, thereby overwriting the content of the memory locations immediately before or after the buffer. Generally, a buffer overflow is undesirable because it corrupts memory and potentially generates a memory fault.

Heap smashing attacks and stack smashing attacks are two types of attacks that a malicious program may make that relate to violations of the memory integrity. Heap smashing attacks involve the heap section of the memory, and stack smashing attacks involve the stack section of the memory. The heap is an area of a memory, such as a Random Access Memory, that is dynamically allocated by programs at run-time to store. By contrast, the stack is an area of memory used to store objects related to a function call. For example, the program counter, return address of the function, and local variables of the function are stored on the stack. One type of heap smashing attack overruns a heap buffer. A heap overflow attack may be used to overwrite function pointers stored on the heap to redirect the program's control flow. As can be appreciated, a heap smashing attack such as this may be dangerous. For example, a heap smashing attack may be used to gain root access to a remote computer by writing malicious shell script code contained in an attack packet on the heap of the server, thus allowing the attacker to gain root access when the script is executed by the server. In this way, a buffer overflow may be exploited maliciously to alter a program's control flow and thus break the security of the computer system. A heap may be smashed due to an attack by a malicious attack program or due to an inadvertent error by the programmer.

Many systems are written in unsafe programming languages (such as C or C++) which are optimized for high performance but provide only limited error checking. Such languages may allow executing programs to call a "library function" to perform an operation such as writing data to memory. A "library" is a collection of precompiled functions that a program can use. For example, the C library function "strcpy" copies a source string pointed to by a first function parameter (also known as an argument) to a destination location pointed to by a second function parameter. Typically, a library function is stored in object format, and the program does not need to explicitly link the library function to every program that uses them (because the linker automatically looks in libraries for routines that it does not find elsewhere). In the MS-Windows® environments, for example, library functions generally have a ".DLL" extension. In unsafe programming languages, a library function may not have any built-in buffer overflow checks. In many cases, it is up to the programmer to check whether a destination buffer has sufficient memory space to accommodate a source string. Unfortunately, many existing programs often omit such buffer overflow checks. As discussed above, the absence of boundary checks may be exploited by attackers to gain unauthorized access to the computer system.

The fundamental solution to buffer overflow attacks relies on a safe coding style: a programmer could avoid unsafe library functions (like strcpy) and could perform careful boundary checks within any program that makes such calls. However, given the huge volume of existing programs, it is not possible to inspect and rewrite all of them to eliminate potential buffer overflow problems. In view of the effort needed to make sure that a string copy does not fail, for example, it is not surprising that many programs do not have these checks and are susceptible to buffer overflows. Furthermore, while there exist preliminary tools that detect a large class of buffer overruns statically, users might not want to wait until programs are fixed by their developers. Nor do users generally have access to the source code of commercial software. A solution to the heap smashing problem that does not need source code access is therefore highly desirable.

SUMMARY OF THE INVENTION

Embodiments of the present invention provide a fault-containment wrapper that effectively protects existing programs from heap smashing attacks caused by library function calls. This fault-containment wrapper provides the same functionality as the library function call but in addition does careful boundary checking. In an embodiment, shared library functions are wrapped such that the wrapped version first checks that a buffer contains sufficient space before calling the original unwrapped function. The buffer space may be kept track of by wrapping allocation functions (such as malloc, calloc, free, etc.) and keeping meta-data for each allocated buffer.

According to an embodiment of the present invention, every function call from a program to a library which could be exploited for heap buffer overflows (e.g., a call that requests writing of a data block to the heap) is intercepted and redirected to the fault-containment wrapper. The wrapper may then make sure that the library function call does not cause an access to any heap memory that is outside an allocated buffer. The present invention provides an approach to the buffer overflow problem that is transparent to existing programs and does not require access to the source code of such programs.

In an embodiment, instructions within the fault-containment wrapper determine whether performing a write request would smash the heap. In an embodiment, the fault-containment wrapper concludes that performing the write request would smash the heap if it is determined that writing the data block as requested would overflow a buffer in the heap. If performing the write request would not smash the heap, the fault-containment wrapper may cause the data block to be written as requested. On the other hand, if performing the write request would smash the heap, the fault-containment wrapper may execute an error handling procedure instead of writing the data block.

In further embodiments, the fault-containment wrapper concludes that performing the write request would smash the heap if either (1) the start address of the memory section where the data block is to be written is not part of a currently allocated buffer in the heap or (2) when this start address is within a buffer, if the data block's size is greater than the size of the memory section extending from this start address to the end of the buffer. Further embodiments provide for methods of determining whether the destination start address is within a currently allocated buffer. For example, in one embodiment, a search of the heap is made for a meta-data field beginning at the destination start address and proceeding in one direction. The fault-containment wrapper of this embodiment may conclude that the memory address is not within any currently allocated buffer if the search reaches a heap boundary without finding a valid meta-data field. A potential meta-data field may be identified by finding a predefined marker in a memory location being examined during the search, and such a potential meta-data field may be confirmed as a meta-data field if the memory section contains a pointer to an entry in the buffer management table.

These and other embodiments are explained further below in the following detailed description.

DETAILED DESCRIPTION

Embodiments of the present invention provide a fault-containment wrapper that is used to prevent heap smashing attacks. A wrapper is software that is used with other software or resources for the purposes of improving the convenience, compatibility, or security of the primary software. In general, the wrapper provides the same functionality as the original software but changes non-operational properties. According to the present invention, a wrapper is used to protect existing and new software against heap smashing attacks that could be caused by library function calls. The present invention provides this protection even if the source code of the existing software is unavailable. In addition to protecting against attacks, the present invention helps software developers by performing most boundary checks automatically, thus alleviating the need for the software developer to include boundary checks. In an embodiment, the present invention implements boundary checks as a dynamically loadable C library wrapper. In this embodiment, the wrapper intercepts every function call to the C library which could be used to write to the heap and performs careful boundary checks before it invokes the function being called.

Figure 1:
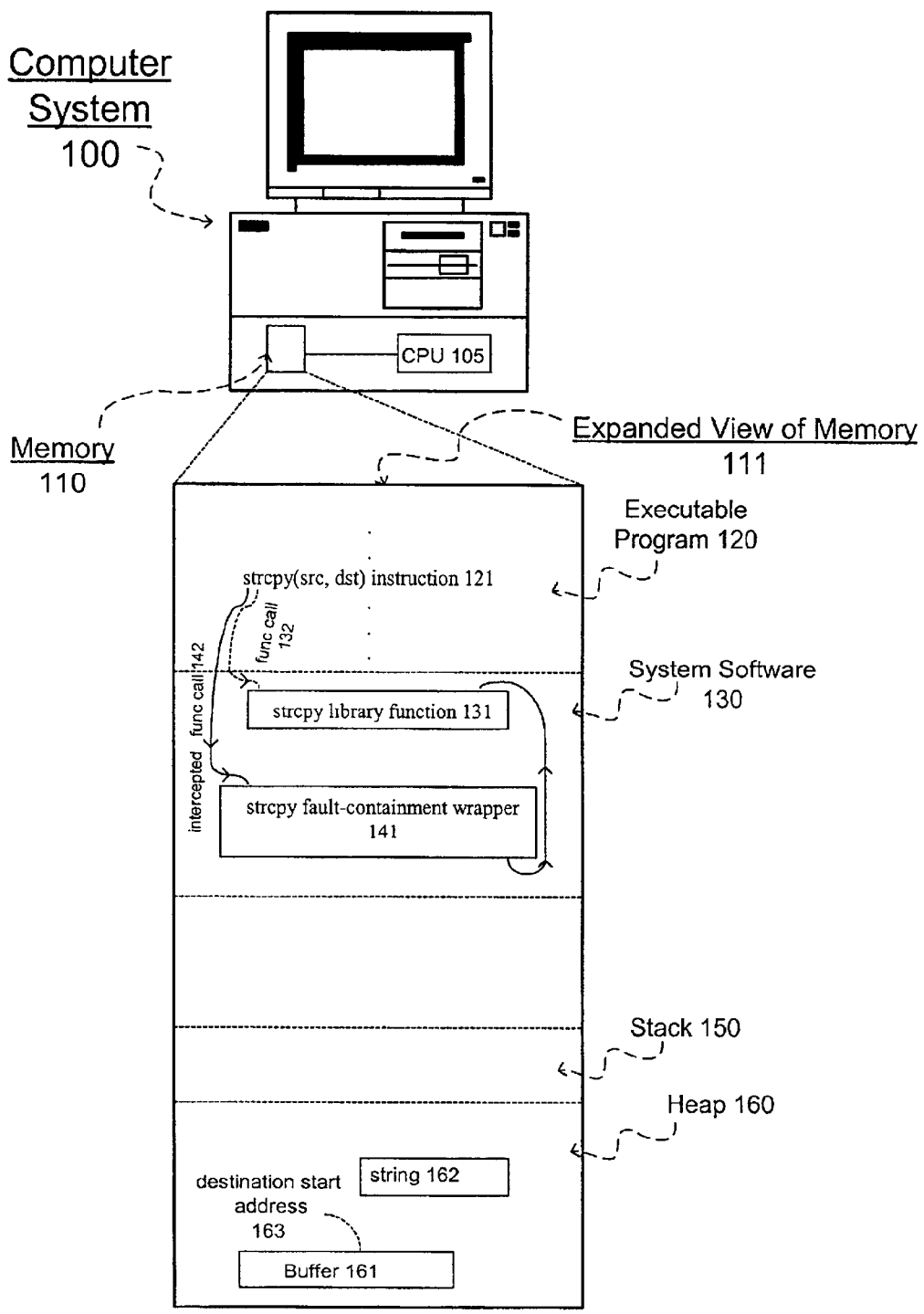
FIG. 1 is a block diagram of a computer system that includes heap smashing fault-containment wrapper software according to an embodiment of the present invention.
Figure 2:
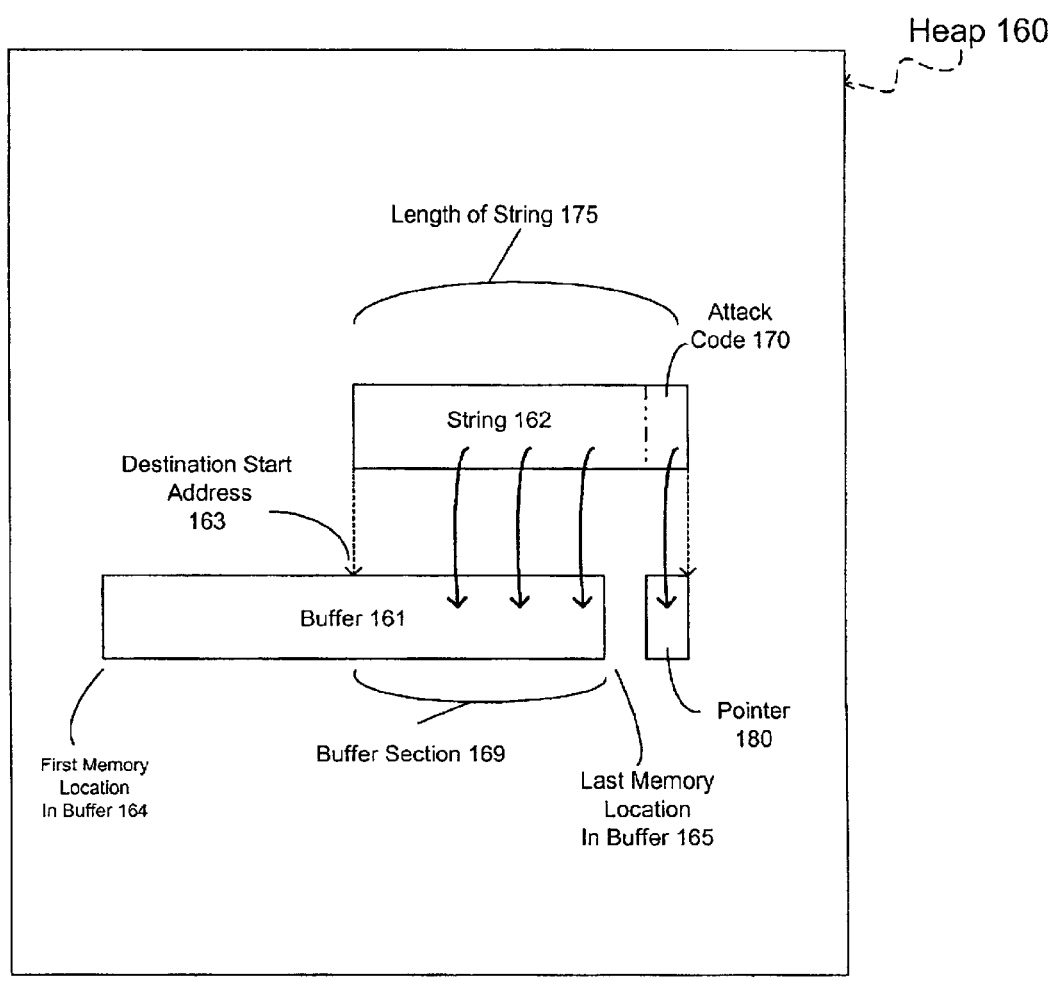
FIG. 2 is a block diagram of a section of the heap memory that is being monitored for buffer overflow according to an embodiment of the present invention.
Figure 3:
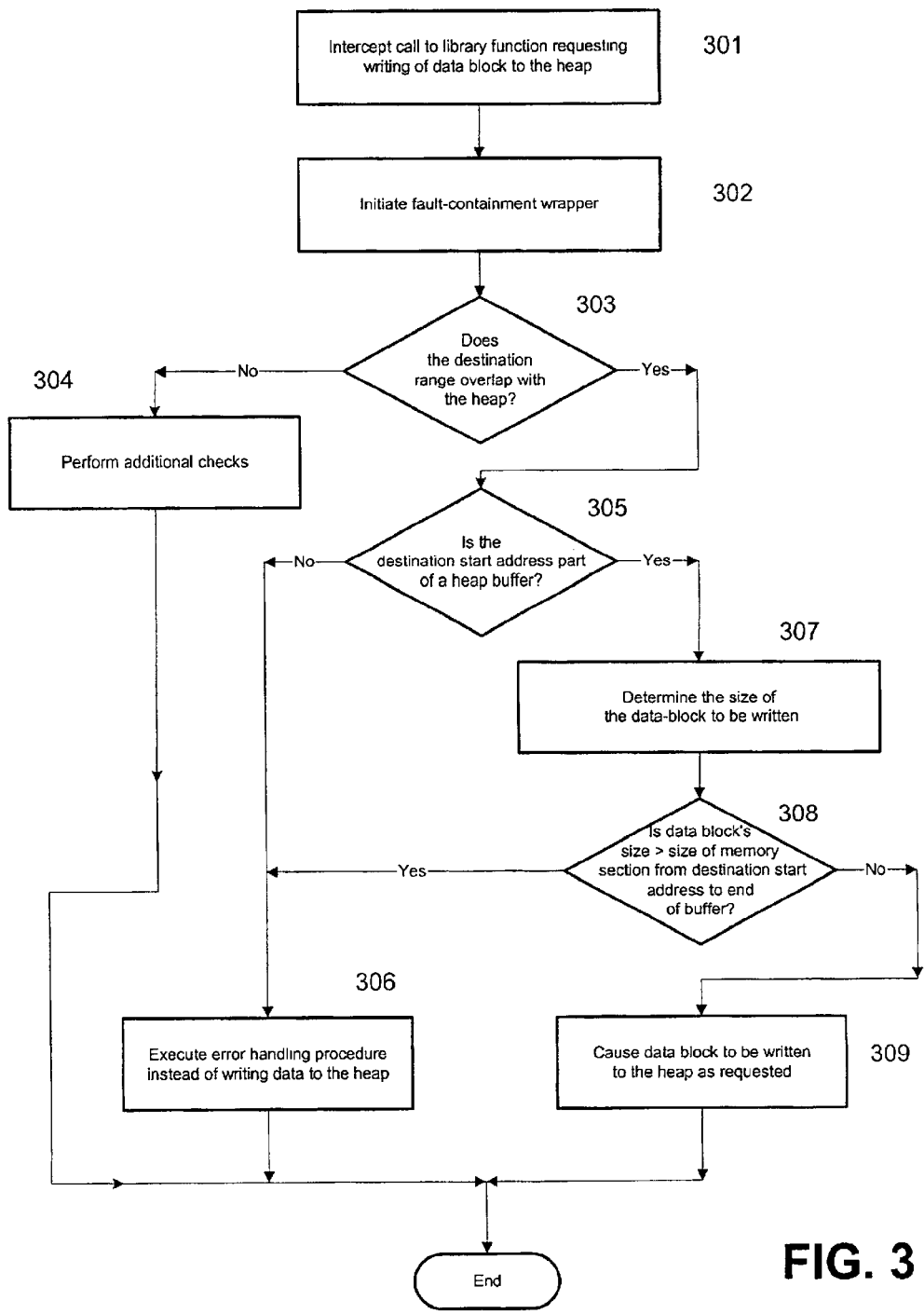
FIG. 3 is a flow diagram of a method of detecting heap smashing according to an embodiment of the present invention.
Figure 4:
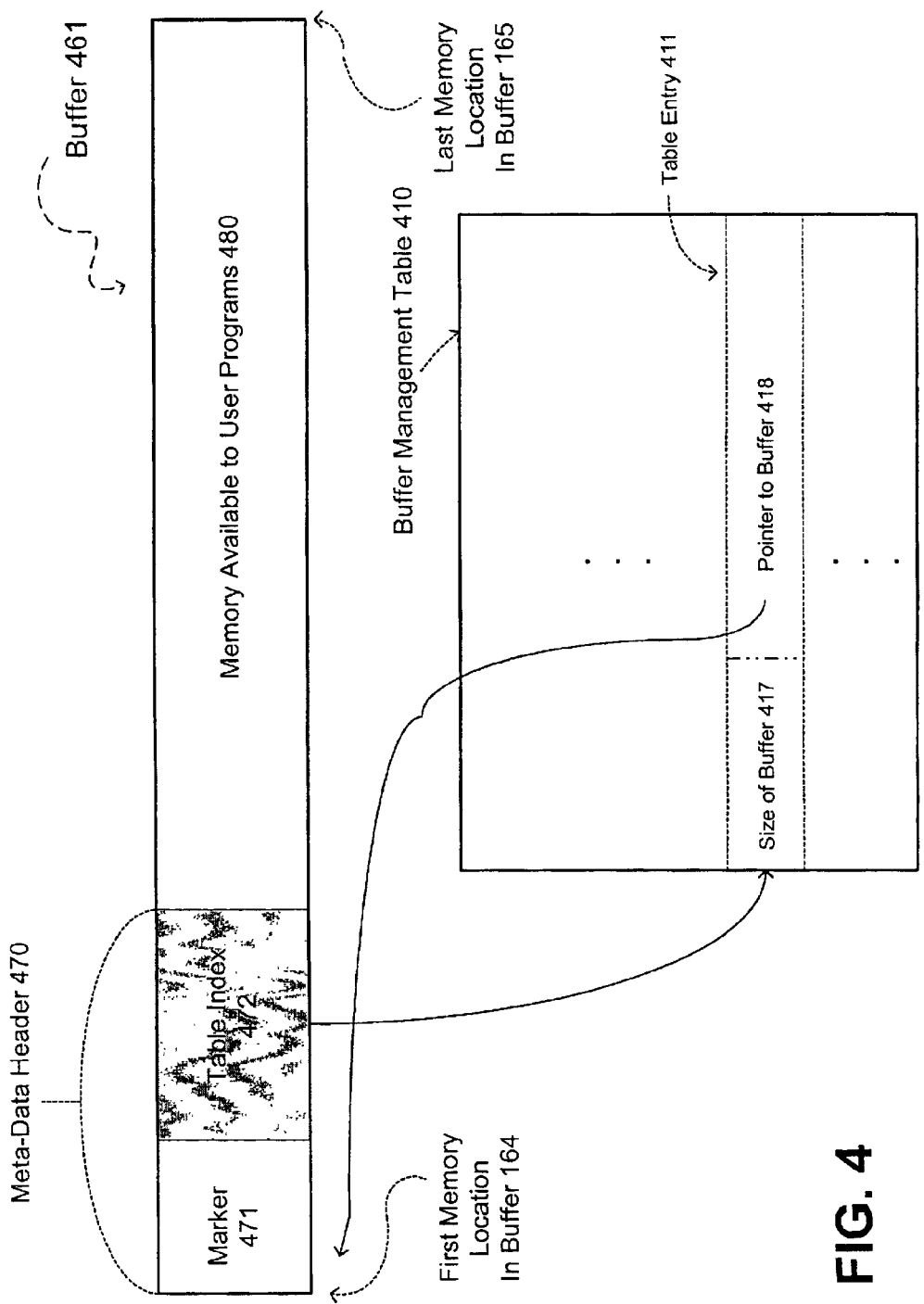
FIG. 4 is a block diagram of a buffer and a buffer management table according to an embodiment of the present invention.
Figure 5:
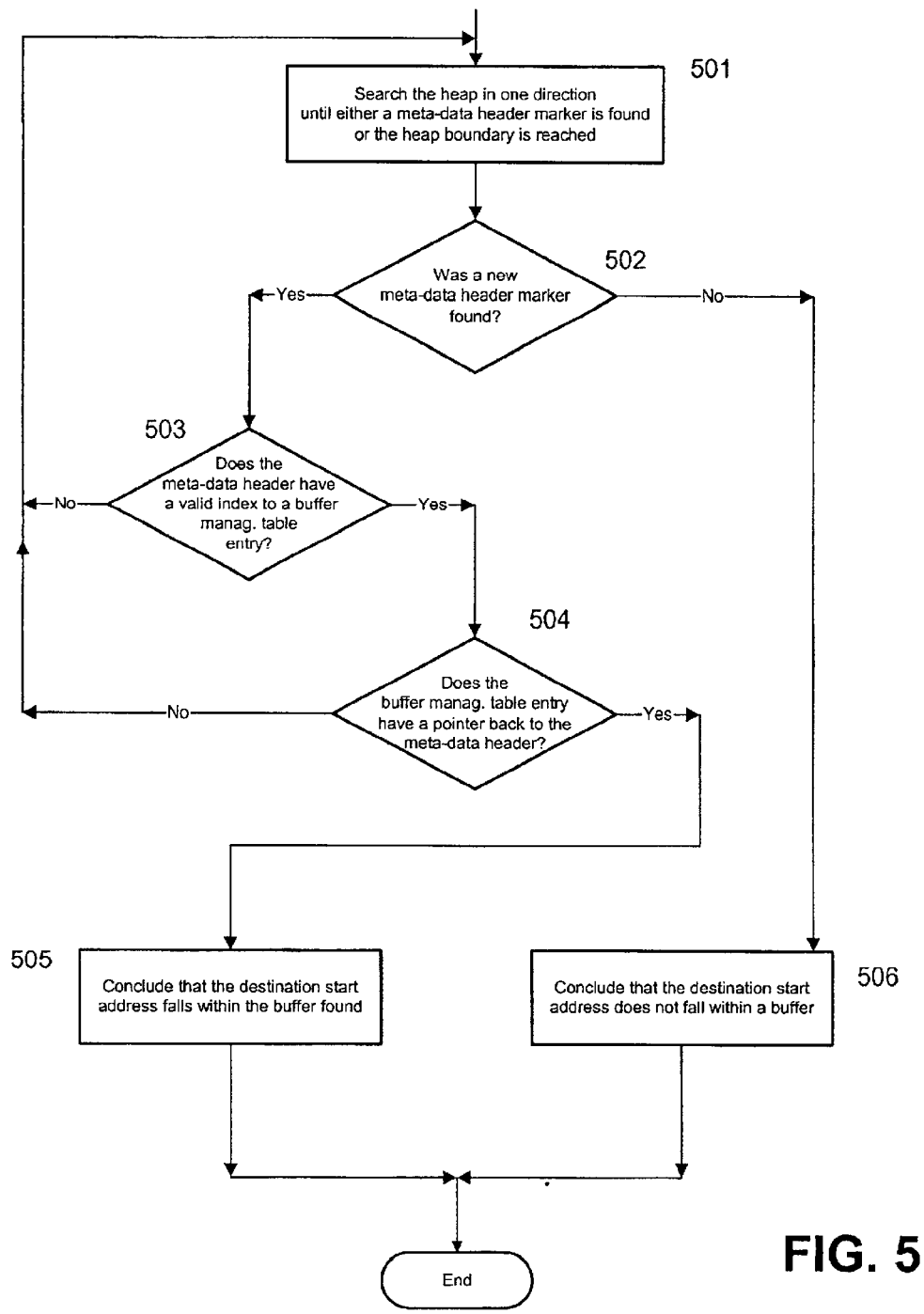
FIG. 5 is a flow diagram of a method of determining whether the destination start address falls within a heap buffer according to an embodiment of the present invention.

The following detailed description begins by discussing, with reference to FIGS. 1–3, the general operation of the fault-containment wrapper of the present invention. FIG. 1 shows how the present invention modifies the control flow instructions executed (i.e., a program, a library function that is called by that program, and a fault-containment wrapper for that library function). Implementations of performing buffer boundary checking are then discussed, and one embodiment is illustrated by FIGS. 4–5. Finally, a number of implementation issues are also discussed.

General Operation of the Fault-Containment Wrapper

FIG. 1 is a block diagram of a computer system that includes heap smashing fault-containment wrapper software according to an embodiment of the present invention. FIG. 1 shows a computer system 100 that includes a memory 110 and a central processing unit (CPU) 105. Memory 110 may be, for example, Random Access Memory (RAM) that is used by computer system 100 to store an operating system, executable programs, and data. Computer system 100 may contain other components such as input/output devices, a network connection, and other memory devices such as disk memory devices.

FIG. 1 shows an expanded view of memory 111 that illustrates some of the contents of memory 110. In particular, expanded view of memory 111 shows an executable program 120, system software 130, a stack 150, and a heap 160. As discussed above, heap 160 may be a section of memory 110 that is reserved for data created by a program that is executing. In FIG. 1, executable program 120 may be a program that is being executed by CPU 150, and buffer 161 in heap 160 may be allocated to executable program 120. System software 130 may be a collection of precompiled routines that may be used by programs such as executable program 120. In an embodiment, the source code for executable program 120 was written in the C programming language, and system software 130 includes C library functions.

In the example shown, executable program 120 contains as one of its instructions a strcpy(src, dst) instruction 121, which is a call to the C language library function "strcpy" to copy the data string that is pointed to be a first function parameter "src" to a location that is pointed to by the second function parameter "dst." In an embodiment, "src" is a pointer to a data block that is stored in memory, but in other embodiments it may point to any type of data. Heap 160 contains a data block labeled string 162. In addition, heap 160 contains the data location, labeled destination start address 163, that is located within buffer 161. For the purposes of illustration, the example below assumes that string 162 is pointed to by the "src" parameter in instruction 121 and that destination start address 163 is pointed to by the "dst" parameter of instruction 121.

System software 130 in FIG. 1 includes a strcpy library function 131, and a strcpy fault-containment wrapper 141. Both strcpy library function 131 and strcpy fault-containment wrapper 141 may be a series of instructions that are stored in memory 110 and may be executed by CPU 105. According to typical operations in the C environment, the execution of instruction 121 by CPU 105 would have resulted in the initiation of strcpy library function 131 (i.e., the execution of the instructions which strcpy library function 131 represents). This control flow is represented by function call 132. For discussion purposes, this control flow is shown in FIG. 1 with regard to the location of the stored instructions in memory.

According to embodiments of the present invention, does not directly result in the execution of strcpy library function 131. Rather, in this embodiment the call to the srcpy library function is intercepted and control flow is instead passed to strcpy fault-containment wrapper 141, as shown in FIG. 1 by intercepted function call 142. When strcpy fault-containment wrapper 141 receives control flow after an intercepted function call, instructions in strcpy fault-containment wrapper 141 may be executed to detect whether the execution of strcpy library function 131 with the parameters "src" and "dst" would result in smashing of the heap. A method of detecting buffer overflows using fault-containment wrapper 141 will be discussed in detail below with reference to FIG. 3.

FIG. 2 is a block diagram of a section of the heap memory that is being monitored for buffer overflow according to an embodiment of the present invention. FIG. 2 shows the heap 160 which is stored in memory 110 of computer system 100 as discussed above. FIG. 2 shows heap 160 containing source string 162, buffer 161, and destination start address 163 as also shown in FIG. 1. Buffer 161 is bounded by first memory location 164 and last memory location 165. FIG. 2 shows source string 162 as containing attack code 170, and heap 160 as containing a function pointer 180. For example, source string 162 may be a string of binary numbers that represent the numbers "123456789xyz", where xyz is attack code 170. In this example, source string 162 may be a string that is to be used by a attaching program to take control of computer system 100, and attack code 170 (i.e., number xyz) may be the address of malicious code software that has been stored in memory 110 by the attacking program. Function pointer 180 may be a memory location that is expected to store the address of a function that may be called during the execution of a program by computer system 100.

FIG. 2 shows a result that may occur in one scenario where source string 162 is copied to destination start address 163, as might occur if the strcpy(src, dst) instruction 121 were to call the strcpy library function 131. As shown in FIG. 2, if a string "123456789xyz" were to be copied to buffer 161 starting at destination start address 163, then the length the buffer section 169 that could accommodate string "123456789xyz" would be the amount of memory from destination start address 163 to the last memory location in buffer 165. As also shown in FIG. 2, the first unit (e.g., "1") in source string 162 would be copied into the location pointed at by destination start address 163. In the example shown, the length of string 162 is greater then the length of buffer section 169, and thus coping string 162 to the locations starting at destination start address 163 will lead to an overflow of buffer 161. That is, part of string 162 will overwrite memory addresses that are not part of buffer 161. In the example shown, the attack code 170 (which is part of string 162) may overwrite function pointer 180. In this way, a malicious program could cause program control to be redirected to a malicious function that is pointed at by attack code xyz.

FIG. 3 is a flow diagram of a method of detecting heap smashing according to an embodiment of the present invention. For the purposes of illustration this method will be discussed with reference to the computer system 100 shown in FIG. 1, but of course this method may be performed with different computer systems. Prior to the beginning of the example shown in FIG. 3, it is assumed that a program has made a call to a library function that requests writing of a data block to the heap. Continuing the example discussed above, the strcpy(src, dst) instruction 121 may have been executed to invoke strcpy library function 131 in order to copy the source string 162 (pointed to by the parameter "src") to the locations starting at destination start address 163 (pointed at by the parameter "dst"). The method shown in FIG. 3 may be performed by instructions in strcpy fault-containment wrapper 141.

As shown in FIG. 3, the call to the library function is intercepted (301) and the fault-containment wrapper is initiated (302). Thus, instead of directly initiating strcpy library function 131 (as shown by function call 132 in FIG. 1), the intercepted function call 142 causes the initiation of strcpy fault-containment wrapper 141. Intercepting of a function call may be provided for by preloading a fault-containment wrapper in a dynamic link loader. A dynamic link loader links programs with library functions at run-time, and may allow the sharing of library functions between multiple programs. In an embodiment of the present invention, the dynamic link loader is configured so that it loads the fault-containment wrapper first. Thus, when the function call instruction in a program is executed, the function call will be intercepted because the linker will resolve the function name to the fault-containment wrapper instead of to the original library function.

In an embodiment, the fault-containment wrapper first determines whether the data is being written to the heap by determining whether the destination range (e.g., from the destination start address to the destination start address+ length of string) overlaps the heap (303). In this embodiment, if data is not being written to the heap, then the wrapper does not check for heap smashing but instead may perform additional checks (304) such as for stack smashing. In an embodiment, if stack smashing is detected, an error handling procedure may be performed instead of writing the data to the stack.

If the data is being written to the heap, the fault-containment wrapper may determine whether copying the string to the destination would have caused the heap to be smashed and might take appropriate action based on the conclusion of this determination. In one embodiment, the fault-containment wrapper determines whether the destination start address falls within a currently allocated heap buffer (305). With regard to the example discussed above, strcpy fault-containment wrapper 131 may determine if destination start address 163 is part of any allocated buffer in heap 160. If the destination start address does not fall within a heap buffer, then an error handling procedure is executed instead of writing the data to the heap (306) (i.e., instead of writing the data-block source string 162 to dst address 161 as requested). The error handling procedure may call for the wrapper to log an error message and abort the program. If the destination start address does fall within a the heap buffer, then the fault-containment wrapper determines the size of the data-block to be written to the heap (306) and then determines if the data-block's size is greater than the size of the memory section which starts at the destination start address and ends at the end of the buffer (308). That is, the fault-containment wrapper determines if writing the data would overflow the buffer. For example, strcpy fault-containment wrapper 131 may determine if writing source string 162 (i.e., the string pointed to be the first parameter of instruction 121) to destination start address 163 (i.e., the location pointed to by destination start address 163) would overflow buffer 161. If writing the data would overflow the buffer (as shown in FIG. 2), then the error handling procedure is performed (307). If writing the data would not overflow the buffer, then the fault-containment wrapper may cause the data-block to be written to the heap (309). In an embodiment, the fault-containment wrapper may cause the data-block to be written to the heap by calling the library function (i.e., strcpy fault-containment wrapper 141 may call library function 131). The fault containment wrapper may call disym, a function in the dynamic link library, to provide a pointer to the original library function being called. In an embodiment, this pointer is stored for future use by the fault-containment wrapper. As would be appreciated by a person of skill in the art, the disym function is an example of a function that provide users direct access to the dynamic linking facilities and may allow processes to obtain the address of an undefined symbol.

Boundary Checking

As discussed above, the fault-containment wrapper may be used to check whether a destination start address is within the boundary of a buffer and, if so, whether the string being written starting at that destination start address will fit within the buffer. If the destination start address belongs to a buffer on the heap, then a buffer overflow occurs only if the length of the string is greater than the number of bytes between the destination start address and the end of the designated buffer. Even if a write operation does not result in a heap smashing, it still may result in a stack smashing or smashing of other data areas, and as discussed below in embodiments the wrapper also contains checks for such smashing attacks. In one embodiment, a function range(p) is used that may return a predetermined value (e.g., a negative number) if p does not belong to a block allocated on the heap; otherwise, range(p) returns the number of bytes between p and the end of the allocated buffer. In an embodiment, determining whether a strcpy(dst, src) operation would result in a heap smashing involves testing if the address range of the copied string [dst, dst+length of string+1] overlaps with the address range of the heap [heap_start, heap_end], and if so whether the range of the destination pointer (range(dst)) is longer than the length of src (strlen(src)). In an embodiment, the range of the destination pointer has to be strictly longer than the length of the source string to account for the terminating zero.

A number of different methods may be used to check if whether a destination start address is within the boundary of a buffer (i.e., to implement the function range). Two such embodiments will now be discussed. The first implementation) searches through all previously allocated memory buffers to find the one that contains the destination start address. An efficient algorithm may be used to search through entries in an internal buffer management table to locate the appropriate memory buffer. For example, the entries in this buffer management table may be organized as a Red/Black tree. In an embodiment, each node in the Red/Black tree corresponds to an allocated memory buffer, and the key consists of the start and end address of the buffer. Because the addresses of buffers are non-overlapping, in such a tree there is a total order between these address ranges. It is well-known that the complexity of search, insert, and remove operations in a Red/Black tree is logarithmic to the number of entries in the tree. Hence this protocol is reasonably efficient for large tables.

A second embodiment uses special data structures to reduce the complexity of inserts and removes. FIG. 4 is a block diagram showing such special data structures. In particular, FIG. 4 shows a buffer 461 and a buffer management table 410 according to an embodiment of the present invention. Buffer 461 is a buffer that is stored on the heap and may be the same as buffer 161 of FIG. 1. In this embodiment, a header has been added to each allocated buffer to store certain meta-data. Thus, buffer 461 contains a meta-data header 470 in addition to a section of memory available to user programs 480. The amount of memory allocated for each buffer (470+480) is therefore slightly larger than what is returned to the user (480). In the embodiment shown, the meta-data header 470 contains a marker 471 and a table index 472. In an embodiment, the marker 471 is used to find a buffer and, for example, may mark the beginning of a memory buffer. The marker 471 may be a "magic number" that is unlikely to appear in ordinary user program. Table index 472 points to an entry 411 in buffer management table 410 that corresponds to buffer 461. Buffer management table 410 is a separate table that stores the size and the address of each allocated buffer in the heap. As shown in FIG. 4, each entry in buffer management table 410 contains a field for the size of buffer 417 and a pointer to buffer 418 (e.g., the address of the first memory location in the buffer) for each buffer in the heap. In other embodiments, other data-structures are used. For example, and as discussed below, the order of the marker 471 and the table index 472 may be reversed and/or the meta-data field may be located at another part of the buffer such as at the end of the buffer.

FIG. 5 is a flow diagram of a method by which the wrapper may determine whether the destination start address falls within a heap buffer according to an embodiment of the present invention. This method will be explained with reference to the buffer 461 and buffer management table 410 of FIG. 4, but of course other data structures may be used. Starting from the destination start address being written to (e.g., destination start address 163), a search of the heap is made in one direction until either the marker 471 is found or the heap boundary is reached (501). That is, function range (p) searches the memory preceding pointer p and compares the location being examined with the marker value. If a word does not match the marker, then it cannot be the start of a buffer. If a new marker 471 was not found before reaching the heap boundary (502), then the wrapper concludes that the destination start address does not fall within a buffer (506). If a marker 471 was found (502), then is likely that the starting point of a buffer has been found. However, because the marker value can occur inside a user region coincidentally, in an embodiment the wrapper consults buffer management table 410 to verify whether the corresponding address is indeed the start of a buffer. In the embodiment shown in FIG. 5, the wrapper determines whether the table index 472 in the meta-data header 470 has an index to an entry in the buffer management table 410 (503). That is, the wrapper first checks whether the index points to an entry in the table. If not, then a valid buffer header has not been found and the wrapper continues the search (501). If the table index 472 does point to an entry in table 410, then in this embodiment the wrapper determines whether the pointer to buffer 418 in the buffer management table entry 411 points back to buffer 461 (504). The wrapper may compare the address of the marker value and the address stored in the table entry to see whether they are the same. If not, then a valid buffer header has not been found and the wrapper continues the search (501).

If pointer to buffer 418 in the buffer management table entry 411 points to buffer 461, the wrapper may conclude that the start of the allocated buffer is found and that the destination start address falls somewhere within this buffer (505). In an embodiment, the wrapper then computes a return value for the function call to range(p) by taking the difference between the end address of the allocated buffer and the destination start address (p) plus 1, with range(p) returning a negative value of the destination start address (p) does not belong to an allocated block. The search for the start address terminates when either the first allocated block is found or when the search reaches the boundary of the heap (in the latter case the function range(p) may return a value signifying that the search was not successful). The above-described implementation may be referred to as a linear search algorithm because the amount of search time is linear with respect to the offset of p from the start of the memory buffer in that every word could potentially be the starting point of a buffer.

The number of comparisons when searching for the marker number may be reduced by as much as 50% by aligning each buffer at a 64-bit boundary, thus substantially reducing the set of addresses which could be the start of the buffer and in turn reduces the number of search steps to find the marker. For example, a 32-bit marker in the buffer may be aligned on a 64-bit boundary so that the wrapper may compare the marker only with every second 32-bit word. Moreover, this alignment may be done without additional memory overhead because the index may be placed either before or after the marker to align it appropriately. When a marker number is found, the search algorithm may then test if the word before or after the marker is a valid index. This optimization may be generalized to reduce the number of search steps to be logarithmic with respect to the offset of p by restricting the start address of every allocated memory block to be a power of 2. Thus, the start address of a memory block of size s may be aligned at a msb(s)-byte boundary, where msb(s) is the most significant bit of the binary representation of s. In an embodiment, this alignment may be achieved through a wrapper for the allocation functions, as is further discussed in the next section below. Such a wrapper may call the "memalign" library function or its equivalents to align the boundaries.

According to an embodiment of the alignment method, the wrapper for a library function that handles writing to the heap (which may be referred to generally as the strcpy fault-containment wrapper for convenience) first checks whether the next-smaller 32-bit aligned word, as offset from the destination start address, contains the marker. If not, it may be concluded that that the block is bigger than 32-bit and the wrapper may then check the next smaller 64-bit aligned word. If this also fails, the wrapper may conclude that the block is bigger than 64-bit and may look at the 128-bit aligned word. This process may be repeated by doubling the word size until the search terminates. The distance between consecutive words that are checked for the marker increases exponentially. In effect, the wrapper has turned the previous linear search into a logarithmic search in that the number of search steps is logarithmic to the offset of the destination start address. There is, however, a tradeoff between search time and memory usage as well as allocation overhead. Although a logarithmic search reduces the amount of search time, it may introduce memory fragmentation and may also increase the allocation time. Whether or not the benefit of the reduction in search time would outweigh the additional overhead to implement this algorithm depends upon the offsets experienced in the string copy operations. A linear search is generally preferable for small offsets due to its low overhead and better memory utilization, while a logarithmic search is desired for large offsets because it can substantially reduce the number of search steps.

Ideally, an algorithm adaptively switches between these two strategies. In fact, for a particular application, it is possible to analyze its memory access pattern and select an appropriate strategy. For a generic wrapper that is suitable for any application, a hybrid search algorithm may be used. According to an embodiment of a hybrid search algorithm, when a program executes an allocation library function call such as malloc(size), an associated wrapper invokes the original function (e.g., malloc) if the size of allocated memory is smaller than a certain threshold which may be designated as "thresh." Otherwise, this wrapper aligns the allocated memory as described above in order to reduce the amount of search time. When the program later executes a call to write to the heap, the strcpy fault-containment wrapper may first performs a linear search for up to thresh steps. If it cannot find the start address of the memory block, then it switches to a logarithmic search. In this way, the wrapper may achieve reasonably good performance for all situations. For example, if the size of the buffer being allocated is less then the threshold, then the wrapper calls the original malloc(size+headersize) library function to provide for a later linear search. If the size of the buffer being allocated is greater than or equal to the threshold, then the wrapper calls the memalign(msb(size+headersize), size+headersize) library function to provide for a later logarithmic search. The strcpy wrapper should not skip the initial linear search phase since it will not know that the block enclosing the destination start address is greater than thresh. However, it may skip this phase if blocks of size smaller than thresh are allocated in a different region than block of size greater than thresh.

Keeping Track of Blocks

In order to perform boundary checks of allocated buffers, the wrapper or associated software should keep track of the memory allocation status on the heap. The difficulty is that the existing interface for allocating memory may be very simple. For example, the malloc function in the standard C library only returns the start address of the allocated memory. In order to perform boundary checks, programmers either have to keep track of the allocated blocks or use systems with better debugging support (such as Vmalloc).

To achieve transparent protection of existing software even when the source code is unavailable, an embodiment of the present invention provides a wrapper to keep track of the allocated blocks and to perform the boundary checks. The allocation wrapper may be part of the fault-containment wrapper or may be a separate wrapper function. When a program executes a request to allocate memory on the heap (for example a p=malloc(size) instruction), this call is intercepted and the allocation wrapper is invoked. In an embodiment, the allocation wrapper in turn invokes the allocation library function to perform the memory allocation and then records the position and size of allocated memory in an internal table, such as buffer management table 410 of FIG. 4. Later when the program executes an instruction to de-allocate memory, such a free(p) request, the wrapper is again invoked to remove the corresponding entry from its table. By doing so the wrapper can be kept up to date with the current memory layout. Thus, the entries in the buffer management table 410 may each correspond to currently allocated buffers.

Other Implementation Issues

An implementation problem may occur when an application calls a library function such as the C realloc library function to increase the size of a previously allocated block. When the logarithmic or hybrid search approach is used, the alignment boundary of an allocated block depends on its size. Hence increasing the size of a buffer might require a realignment of the buffer. One embodiment allocates a new buffer that is appropriately aligned, copies the old user data, and then frees the old buffer. This is consistent with the semantics of realloc which also copies a block in case it cannot resize it at its current address.

As discussed above, a wrapper may resolve an original library function call through an interface function disym of the dynamic link loader. In an embodiment, the wrapper only needs to call disym the first time a library function is called because the wrapper stores the pointer to the library function that dlsym returns. Some versions of the disym function may attempt to call the original library function. In UNIX (unlike in Windows®), this results in another call to the wrapped function. If the wrapper again calls disym to resolve the original function, this may lead to an infinite recursion that ultimately ends up with a memory overflow. In an embodiment, this problem may be addressed by associating a recursion detection variable with the library function. This variable records whether the wrapped has been called previously. If so, then the wrapper does not call dlsym again to resolve the original function call but rather may return an empty pointer. The GNU implementation of dlsym uses a static buffer for the resolution of malloc. For other implementations of the dlsym function the wrapped could return statically allocated memory until the original function is resolved.

Embodiments of the present invention are used with programs that are dynamically linked with the library. In an embodiment, the fault-containment wrapper intercepts every C library function call which is related to memory operations. Source code modification or recompilation may not be required when an embodiment of the present invention is used. For example, on most UNIX systems a user interested in using a wrapper to protect certain network services may preload the wrapper by defining the LD_PRELOAD environment variable. In addition, a system administrator may enable a wrapper on a system-wide basis through a dynamic link loader. The wrapper of the present invention can be used on Linux systems as well as other systems that provide an appropriate interface to the dynamic link loader.

Wrapper functions may be generated for each library functions that could cause a heap smashing. In the C program language, for example, there are more than a hundred such library functions. The wrapper functions may be generated using a code generator program.

Even if a library function call does not cause heap smashing, it might result in a stack smashing or smashing of other data areas like the static data section. In an embodiment, the wrapper may be configured to evaluate additional conditions that prevent stack smashing attacks. In an embodiment, the wrapper prevents any smashing caused by C library functions by preventing them to write to any location outside the heap and the stack.

Several embodiments of the present invention are specifically illustrated and/or described herein. However, it will be appreciated that modifications and variations of the present invention are covered by the above teachings and within the purview of the appended claims without departing from the spirit and intended scope of the invention. For example, although the present invention is discussed above with regard to a malicious heap smashing attack that overflows a heap buffer, the present invention may be used to prevent other types of heap smashing and may be used to prevent accidental heap smashing as well as malicious heap smashing. Similarly, although the examples above discuss the strcpy function, the present invention may also be used with any other function that could cause heap smashing.

What is claimed is:

1. A method comprising:

intercepting a call from an executing program to a library function, wherein said function call requests writing of a data block to the heap section of a memory;

determining whether performing said write request would smash the heap;

executing an error handling procedure instead of writing the data block if performing said write request would smash the heap; and causing the data block to be written as requested if performing said write request would not smash the heap.

2. The method of claim 1, wherein if writing the data block as requested would overflow a buffer in the heap, then the conclusion of said determining step is that performing the write request would smash the heap.

3. The method of claim 1, wherein a parameter accompanying said function call is a start address of a destination memory section where the data block is requested to be written, and wherein determining whether performing said write request would smash the heap comprises:

determining the size of the data block to be written;

determining whether the destination start address is located within a currently allocated buffer in the heap;

concluding that performing said write request would smash the heap if the destination start address is not within any currently allocated buffer; and concluding that performing said write request would smash the heap if the destination start address is within an identified buffer and said data block's size is greater than the size of the memory section extending from the destination start address to the end of said identified buffer.

4. The method of claim 3, wherein each currently allocated buffer contains a meta-data field, and wherein determining whether the destination start address is within a currently allocated buffer comprises:

searching the heap in one direction for a meta-data field, wherein the search begins at the destination start address; and determining that the destination start address is not within any currently allocated buffer if the search reaches a heap boundary without finding a valid meta-data field.

5. The method of claim 4, wherein a potential meta-data field is identified by finding a predefined marker in a memory location being examined during the search.

6. The method of claim 4, wherein each currently allocated buffer is associated with an entry in a buffer management table, and wherein a section of memory is identified as a meta-data field only if that memory section contains a pointer to an entry in the buffer management table.

7. The method of claim 6, wherein the memory section is confirmed to be a meta-data field only if the buffer management table entry pointed to also contains a pointer to an address of a memory location in said meta-data field.

8. The method of claim 4, wherein the search for a valid meta-data filed assumes that each memory buffer is aligned at a boundary that is proportional to its size.

9. The method of claim 1, wherein said step of intercepting a function call is provided for by a dynamic link loader resolving to the fault containment wrapper any references to the function in the executing program.

10. The method of claim 1, wherein causing the data to be written as requested comprises:

determining whether the function was previously called;

resolving the called function through an interface function of the dynamic link loader, if the function was not previously called; and returning without calling the function again if the function was previously called.

11. An article of manufacture comprising a computer-readable medium having stored thereon instructions which instructions comprise a fault-containment wrapper module for library function calls, wherein said instructions when executed cause the processor to:

receive an intercepted call from an executing program to a library function, wherein said function call requests writing of a data block to the heap section of a memory;

determine whether performing said write request would smash the heap;
execute an error handling procedure instead of writing the data block if performing said write request would smash the heap; and
cause the data block to be written as requested if performing said write request would not smash the heap.

12. The article of manufacture of claim 11, wherein said determining step concludes that writing the data block as requested would overflow a buffer in the heap if the instructions determine that performing the write request would smash the heap.

13. The article of manufacture of claim 11, wherein one parameter accompanying said function call is a start address of the memory section where the data block is requested to be written, and wherein the instructions determine whether performing said write request would smash the heap by:
determining the size of the data block to be written;
determining whether a destination start address is located within a currently allocated buffer in the heap; and
concluding that performing said write request would smash the heap if the destination start address is not within any currently allocated buffer; and
concluding that performing said write request would smash the heap if the destination start address is within an identified buffer and said data block's size is greater than the size of the memory section extending from the destination start address to the end of said identified.

14. The article of manufacture of claim 13, wherein each currently allocated buffer contains a meta-data field, and wherein said determining whether the destination start address is within a currently allocated buffer comprises:
searching the heap in one direction for a meta-data field, wherein the search begins at the destination start address; and
determining that the destination start address is not within any currently allocated buffer if the search reaches a heap boundary without finding a valid meta-data field.

15. The article of manufacture of claim 14, wherein a potential meta-data field is identified by finding a predefined marker in a memory location being examined during the search.

16. The article of manufacture of claim 14, wherein each currently allocated buffer is associated with an entry in a buffer management table, and wherein a section of memory is identified as a meta-data field only if that memory section contains a pointer to an entry in the buffer management table.

17. The article of manufacture of claim 16, wherein the memory section is confirmed to be a meta-data field only if the buffer management table entry pointed to also contains a pointer to an address of a memory location in said meta-data field.

18. The article of manufacture of claim 14, wherein the instructions to search for a valid meta-data filed assume that each memory buffer is aligned at a boundary that is proportional to its size.

19. The article of manufacture of claim 14, wherein intercepting of the function call is provided for by a dynamic link loader resolving to the fault containment wrapper any references to the function in the executing program.

20. The article of manufacture of claim 14, wherein the instructions cause the data to be written by:
determining whether the function was previously called;
resolving the called function through an interface function of the dynamic link loader if the function was not previously called; and
returning without calling the function again if the function was previously called.

21. A method comprising:
intercepting a call to a library function, wherein the function call provides for writing a data string to a block of addresses within a heap section of a memory; and
initiating a fault-containment wrapper to perform steps that comprise:
determining whether writing the data string to the block of addresses would overflow a buffer within the heap;
causing the data string to be written to the block of addresses if it was determined that said writing would not overflow a buffer; and
executing an error handling procedure if it was determined that said writing would overflow a buffer.

22. The method of claim 21, wherein determining whether writing the data string to the block of addresses would overflow a buffer comprises:
concluding that said writing would overflow a buffer whenever both:
a first address within said block of addresses is within a currently allocated buffer in the heap; and
the distance from said first address to the address of a last location in said currently allocated buffer is less than the size of the data string.

23. The method of claim 22, wherein the fault-containment wrapper also keeps track of the allocation of buffers in the heap, and wherein information about the buffer allocation is stored in a buffer allocation data structure.

24. The method of claim 23, wherein the method further comprises determining whether the first address is within said block of addresses within a currently allocated buffer based on information from the buffer allocation data structure.

25. The method of claim 24, the method further comprises:
searching the memory linearly from said first address within said block of addresses for a buffer marker;
confirming whether an actual buffer marker has been found in said search by using information in said buffer allocation data structure; and
concluding that the first address within said block of addresses is not within a currently allocated buffer if the linear search reaches a boundary of the heap without confirming that a buffer marker has been found.

26. The method of claim 25, wherein the search for a valid buffer marker assumes that each memory buffer is aligned at a boundary that is proportional to its size.

27. A fault-containment wrapper for detecting heap buffer overflow, the fault-containment wrapper comprising instructions to:
determine whether writing the data string to the block of addresses would overflow a buffer within the heap;
cause the data string to be written to the block of addresses if it was determined that said writing would not overflow a buffer; and
execute an error handling procedure if it was determined that said writing would overflow a buffer.

28. The fault-containment wrapper of claim 27, wherein the fault-containment wrapper further comprises instructions to conclude that said writing would overflow a buffer whenever both:
a first address within said block of addresses is within a currently allocated buffer in the heap; and the distance from said first address to the address of a last location in said currently allocated buffer is less than the size of the data string.

29. The fault-containment wrapper of claim 27, wherein the fault-containment wrapper also keeps track of the allocation of buffers in the heap, and wherein information about the buffer allocation is stored in a buffer allocation data structure.

30. The fault-containment wrapper of claim 27, wherein the fault-containment wrapper further comprises instructions to:

search the memory linearly from said first address within said block of addresses for a buffer marker;

confirm whether an actual buffer marker has been found in said memory being searched by using information in said buffer allocation data structure; and conclude that the first address within said block of addresses is not within a currently allocated buffer if the linear search reaches a boundary of the heap without confirming that a buffer marker has been found.

31. The fault-containment wrapper of claim 30, wherein the search for a valid buffer marker assumes that each memory buffer is aligned at a boundary that is proportional to its size.

* * * * *